United States Patent [19]
Loeffler et al.

[11] Patent Number: 5,284,065
[45] Date of Patent: Feb. 8, 1994

[54] REMOVABLE OVERDRIVE LOCKOUT

[75] Inventors: John M. Loeffler, Toledo; George A. Willford, Waterville, both of Ohio

[73] Assignee: Dana Corporation, Toledo, Ohio

[21] Appl. No.: 947,767

[22] Filed: Sep. 18, 1992

[51] Int. Cl.$^5$ .............................................. F16H 63/36
[52] U.S. Cl. ......................................... 74/477; 74/475
[58] Field of Search ................................. 74/745, 477

[56] References Cited

U.S. PATENT DOCUMENTS

| | | | |
|---|---|---|---|
| 2,654,268 | 10/1953 | Perkins | 74/477 X |
| 3,229,551 | 1/1966 | Stuckey | 74/745 |
| 3,292,451 | 12/1966 | Jacklin et al. | 74/477 |
| 4,296,642 | 10/1981 | Schetter | 74/47.7 X |
| 4,409,859 | 10/1983 | Yarnell | 74/477 |
| 4,441,379 | 4/1984 | Malkowski et al. | 74/477 |

Primary Examiner—Allan D. Herrmann
Attorney, Agent, or Firm—Marshall & Melhorn

[57] ABSTRACT

A lockout device is provided for inhibiting the selection of certain gear combinations in range shift type transmission. The lockout device comprises an air cylinder mounted to the transmission housing. The air cylinder includes a rod selectively translatable between a retracted position and an extended position. The rod is normally urged to its retracted position, and extends through an aperture in the housing in its extended position to engage a notch in a selected shift rail. The air cylinder and the high range air line are operably interconnected, whereby a shift to high range simultaneously activates the air cylinder, extending the rod into the recess in the shift rail to thereby selectively limit axial translation of the shift rail. The lockout device is easily removable.

12 Claims, 2 Drawing Sheets

REMOVABLE OVERDRIVE LOCKOUT

BACKGROUND OF THE INVENTION

1. Field of the Invention

The invention relates generally to a transmission lockout device and, more particularly, to a removable overdrive lockout device for a range shift type vehicle transmission.

2. Summary of Related Art

Vehicle transmissions, especially those intended for use in heavy equipment, such as trucks and tractors, often include plural multiple gear selecting devices which are mechanically connected. For example, a five forward speed main gear reduction section may be combined with a two speed range gear reduction section providing a low range and a high range. The resulting combination provides ten forward speeds or gear ratios.

In such transmissions, generally known as range shift type transmissions, it is frequently necessary to prevent operation of the transmission in a given combination of gear ratios due to intrinsic design or extrinsic application considerations. It thus may be necessary to positively preclude shifting such a transmission into certain combinations of gear ratios. For example, in a transmission having five forward gear ratios supplemented by a high/low range selection feature, it may be desirable to prevent simultaneous engagement of the fifth gear of the main section and the high range of the range section. This is especially so where the transmission includes a 10th gear overdrive. Any means which will prohibit such a given selection must, of course, not effect the selection of any other gear ratio.

Lockout devices which perform a similar function have been utilized previously on splitter type transmissions. Such lockout devices are comprised of an auxiliary shift rail and lockout pin which mechanically inhibit selection of certain gear ratio combinations. These devices are totally enclosed within the transmission housing and can not be removed or rendered inoperable without disassembling the entire transmission. This is disadvantageous in that original purchasers of trucks typically desire a direct drive transmission to keep highway speeds down and thereby increase economy. On the other hand, many second owners appear to value performance above economy and, therefore, would prefer a truck having a transmission provided with a 10th gear overdrive. Should the original owner desire to remove or render inoperable such a lockout device to increase the resale value of the truck, it would be necessary to disassemble the transmission and remove the lockout device.

SUMMARY OF THE INVENTION

The present invention relates to a gear combination lockout device for a range shift type transmission having a main gear section and a range gear section disposed within a housing. The main gear section includes a first gear ratio selection means for effecting at least two distinct gear drive ratios, and further includes at least one axially translatable shift rail associated with the first gear selection means. The range gear section includes a second gear selection means for effecting at least two distinct gear drive ratios to selectively multiply the gear ratio provided by the main section. The second gear selection means includes an actuator.

A lockout device, provided for inhibiting the selection of certain gear combinations, comprises an actuation member mounted to the housing. A rod disposed within the actuation member is selectively translatable between a retracted position and an extended position by activation of the actuation member. The rod extends through an aperture in the housing in its extended position. A means is provided for activating the actuation member of the lockout device substantially simultaneously with the activation of the actuator means of the second gear selection means. The device is further provided with an engagement means on one of the shift rails associated with the first gear selection means, and the actuation member is positioned on the housing so that the rod engages the engagement means when the rod is in its extended position.

The novel lockout device of the present invention thereby provides a means of selectively preventing or allowing certain gear combinations. Furthermore, the lockout device, being of a relatively simple construction and external to the transmission housing, is easily removed or rendered inoperative depending on the application considerations and needs of the vehicle owner.

BRIEF DESCRIPTION OF THE DRAWINGS

The above, as well as other advantages of the present invention, will become readily apparent to those skilled in the art from the following detailed description of a preferred embodiment when considered in the light of the accompanying drawing Figures, wherein.

DESCRIPTION OF THE PREFERRED EMBODIMENT

Figure 2:
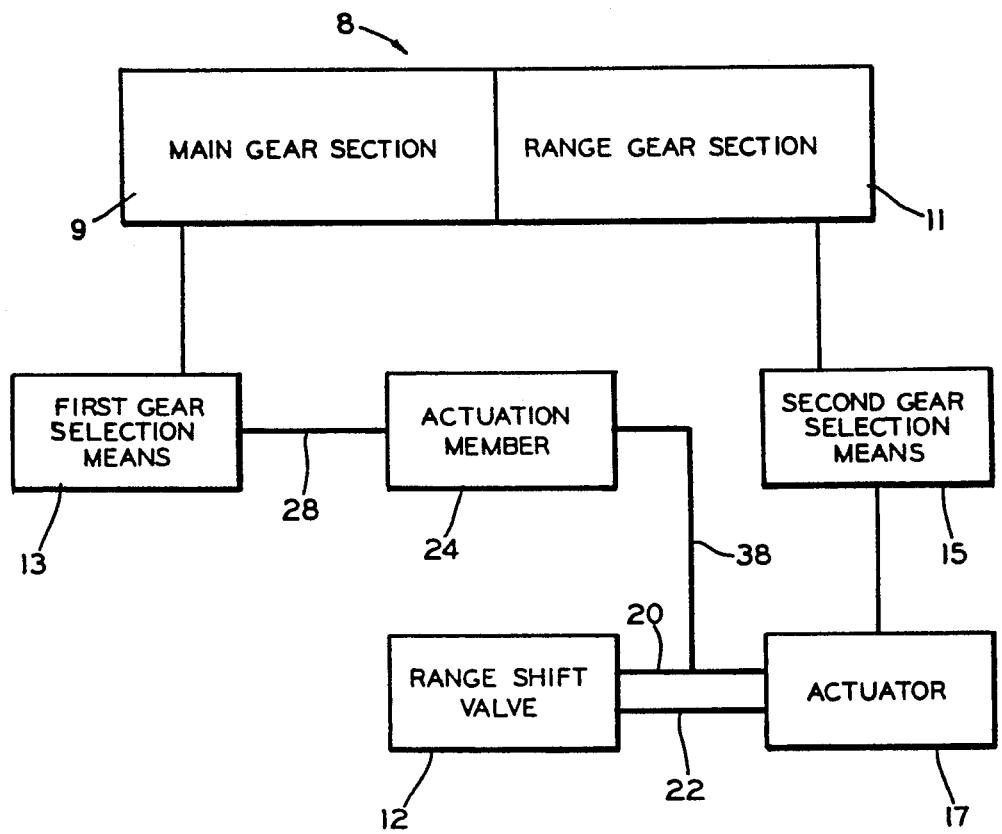
FIG. 2 is a schematic view of the lockout mechanism of the invention connected to a range shift type transmission.
Figure 3:
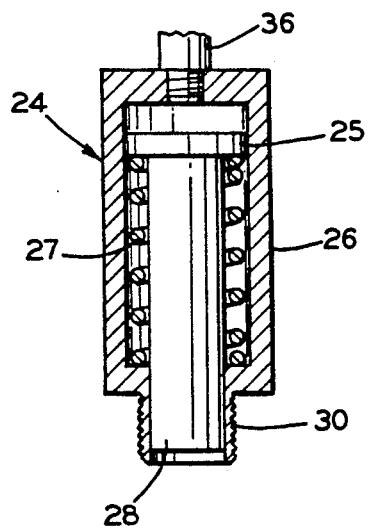
FIG. 3 is a longitudinal sectional view of one embodiment of the actuation member of the lockout mechanism of the invention.

The transmission assembly 8 incorporating the lockout mechanism of the present invention is illustrated schematically in FIG. 2 and will include at least two gear ratio selecting devices in tandem. The main gear reduction section 9 provides a plurality of gear ratios through gears on at least one countershaft which mesh with gears on a main shaft disposed parallel to the countershaft. In addition, the range section 11 selectively multiplies the gear ratio provided by the main section with at least one range countershaft driven from the main shaft. An output shaft is driven directly by the main shaft when in one range, and through the range countershaft when in the other range.

The main shaft of the transmission is generally provided with external splines which engage corresponding internal splines on a plurality of clutch collars, allowing relative axial motion between the clutch collars and the main shaft while preventing relative rotation therebetween. The clutch collars have external splines which selectively engage internal splines on the associated main shaft gears. Selective engagement of only one of the clutch collars with one of its adjacent main shaft gears is effected by a first gear selection means 13, such as the conventional means of a shift fork secured to one of a plurality of shift rails disposed generally parallel to the main shaft. The shift fork, in response to the sliding movement of the associated shift rail, engages the associated clutch collar and moves the clutch collar in either direction along the axis of the main shaft to engage one of the adjacent main shaft gears.

In the range section of the transmission, there is at least one range countershaft driven from the main shaft. The transmission output shaft is generally externally splined to cooperate with internal splines on a range clutch collar for rotation of the range clutch collar with the output shaft. The range clutch collar has splines for selective engagement with a high range output clutch gear when the clutch collar is moved in one axial direction, or engagement with a low range output clutch gear when the clutch collar is moved in the opposite axial direction. The range clutch collar is positioned by a a second gear selection means 15, such as a suitable shift fork secured to a range shift rail. The range shift rail is driven between first and second axial positions by a fluid actuator assembly 17.

The range section fluid actuator assembly generally includes an air-driven, two-position piston disposed within a cylinder. Fluid, typically air, is continually supplied to one or the other of the sides of the piston in the fluid actuator assembly by means of a range shift valve having a high range air supply line and a low range air supply line.

Figure 1:
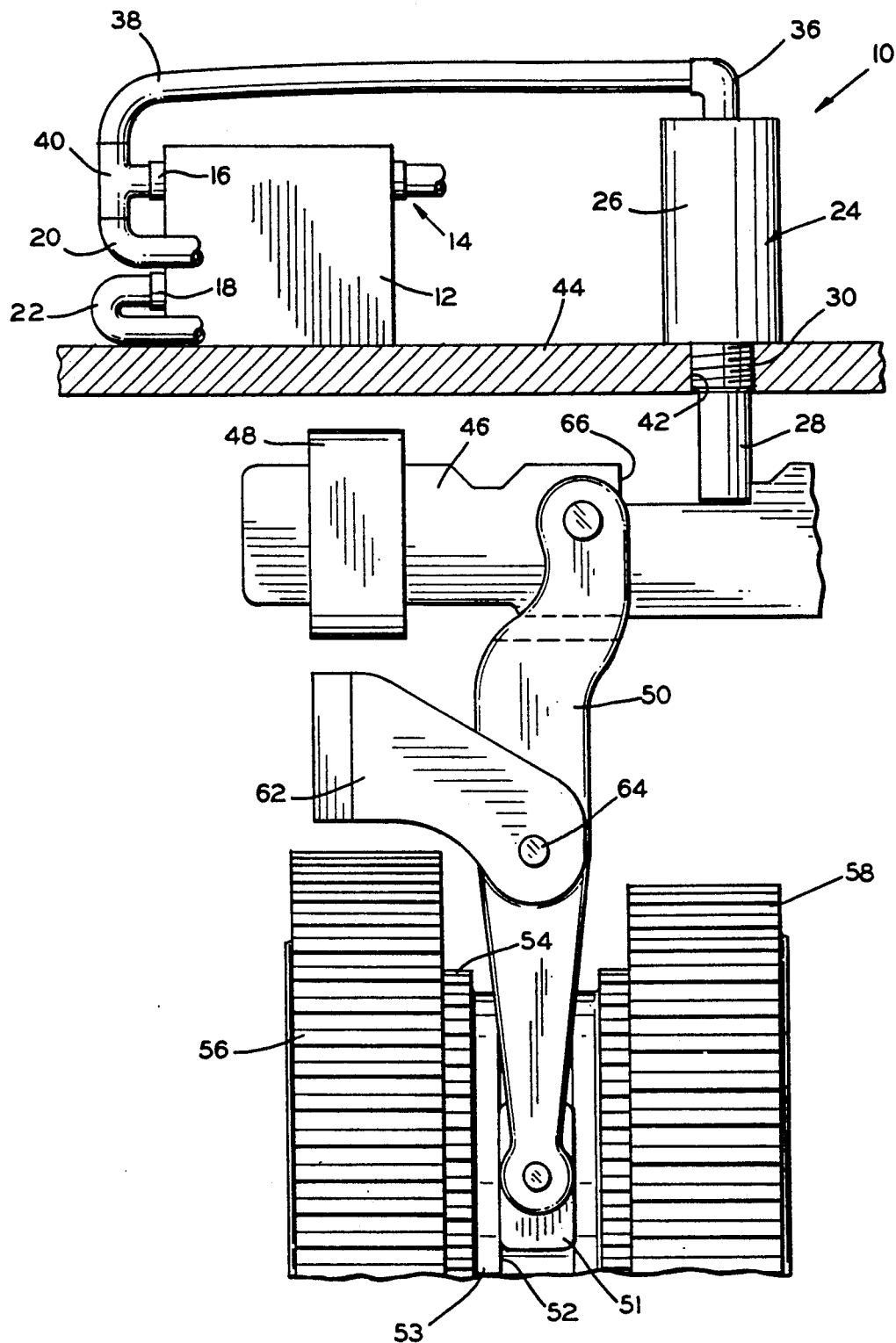
FIG. 1 is a side elevational view of a lockout mechanism in accordance with the present invention as incorporated in a range shift type transmission.

Referring now to FIG. 1, there is illustrated a removable overdrive lockout mechanism 10 in accordance with the present invention as incorporated into a vehicle range shift type transmission, having the input or head end of the transmission to the left as shown in the drawing. The design of the transmission, exclusive of the lockout mechanism 10, is well known and has not been shown in detail in the drawings. The lockout mechanism 10 may be incorporated into any known range shift type transmission, such as that disclosed in my U.S. Pat. No. 4,805,471 entitled MULTI-SPEED TRANSMISSION, the same being incorporated by reference herein.

A range shift valve 12 is provided with an inlet air supply 14, and high range and low range air supply outlets 16 and 18, respectively. The air supply outlets 16, 18 are connected to opposite ends of the air driven, two position piston (not shown) via high range air line 20 and low range air line 22, respectively. The range shift valve 12 is controlled by an auxiliary shift control (not shown) operated by the driver of the vehicle.

To effect a range shift, for example from low range to high range, the driver operates the auxiliary shift control which activates the range shift valve 12 to supply air to the high range side of the piston in the fluid actuator assembly via the high range air line 20. At the same time, the air is exhausted from the low range side of the piston in the fluid actuator assembly via the low range air line 22. The fluid actuator assembly thus connects the output shaft to the main shaft as hereinabove described by movement of the range shift rail, the associated range shift fork, and the range clutch collar to engage the high range.

The lockout mechanism 10 more particularly comprises an actuation member 24, such as an air cylinder having a cylindrical housing 26 within which is disposed a piston 25 affixed to an axially extendable cylinder rod 28. The rod 28 is selectively axially extendable out of the air cylinder 24 through a hollow, cylindrical nipple 30 at one end of the housing 26. The rod 28 is normally retracted within the housing 26 by a suitable biasing means, such as for example a coil spring 27.

The air cylinder 24 is provided with a fluid inlet 36 at or near the end of the housing 26 opposite the nipple 30. The fluid inlet 36 is connected to the high range air supply outlet 16 of the range shift valve 12 via an air cylinder air line 38. As shown in the drawing, the high range air supply outlet 16 of the range shift valve 12 is provided with a T-shaped fitting 40 to which both the high range air line 20 and the air cylinder air line 38 are connected. It will be appreciated that the air cylinder air line 38 could as well be connected to the high range air line 20 at some other point along its length.

Obviously, the rod 28 may alternatively be normally urged to its extended position by suitable biasing means. The fluid inlet 36 would then be positioned at the opposite end of the air cylinder 24, and would be connected to the low range air supply outlet 18 of the range shift valve 12 via the air cylinder air line. The rod 28 would be forced to its retracted position when a shift to low range was executed.

It will also be appreciated that the actuation member 24 of the lockout device may alternatively be an electrical solenoid connected to a suitable power supply. Where the range shift valve 12 is air activated, the solenoid could be electrically interconnected to a pressure sensor and switch unit in communication with high range air line 20. If the range shift valve 12 were electrically activated, the solenoid could be electrically interconnected with the switch for the range shift valve 12.

The nipple 30 of the air cylinder 24 is preferably provided with external threads which are threaded into a tapped hole 42 provided in the transmission housing 44 for the main gear section of the transmission. The tapped hole 42 is positioned in the housing 44 so that its axis, and therefore the rod 28 in its extended position, intersects the shift rail associated with the particular gear to be rendered inoperative by the lockout mechanism. A shift rail 46, commonly known as the 4th/5th shift rail, is illustrated in the drawing and is slidably mounted in a bar support 48. The shift rail 46 is similarly supported near its other end by a support not shown. One end of a shift fork 50 is connected to the shift rail 46, while the other end of the shift fork 50 is provided with a pair of shoes 51 (only one of which is shown in the drawing figure) which engages a slot 52 in the clutch collar 53 in the known manner. As is conventional, the clutch collar 53 is provided with external splines 54 for selective engagement with internal splines (not shown) of gears 56 and 58. As illustrated in the drawing, the gear 56 acts as the 4th forward gear in low range and the 9th direct drive, forward gear in high range. The gear 58 acts as the 5th forward gear in low range and as a 10th overdrive gear in high range.

At a point intermediate its two ends, the shift fork 50 is also pivotally mounted to a support bracket 62 by means of a pivot pin 64. The support bracket 62 and the bar support 48 are both suitably secured to the adjacent portion of the transmission housing (not shown). As the shift rail 46 is moved to the left in the drawing, typically by means of driver operation of a conventional shift lever (not shown), the shift fork 50 pivots about the pivot pin 64 to move the clutch collar 53 to the right to engage gear 58. Likewise, when the shift rail 46 is moved to the right in the drawing, the shift fork 50 pivots about the pivot pin 60 to move the clutch collar 53 to the left to engage gear 56.

The shift rail 46 is provided with a means for engaging the rod 28 when the rod 28 is in its extended position. Preferably, the shift rail 46 is provided with a notch or recess 66 within which the rod 28 is received when in its extended position as shown in the drawing. The shift rail 46 may alternatively be provided with a stop extending towards the air cylinder 24 or other suitable means for engaging the extended rod 28.

The notch 66 is positioned on the shift rail 46 so that, with the rod 28 in its extended position, the shift rail 46 is free to move in one direction, but is restrained from movement in the opposite direction. In the drawing, the shift rail 46 and shift fork 50 are shown in the neutral position, with the rod 28 fully extended and in engagement with the end of the notch 66 on the right as seen in the drawing. The shift rail 46 is mechanically restrained by the extended rod 28 from moving any further to the left. Thus, with the rod 28 fully extended, the shift rail 46, shift fork 50, and clutch collar 53 cannot be moved so as to engage the gear 58. The notch 66 is so positioned, and is of sufficient length, that the shift rail 46 is free to operate in its full range of motion in the opposite direction. Clearly, the notch 66 must be formed such that the shift rail 46 may be moved to its neutral position. This allows the movement of the shift rail 46, shift fork 50, and clutch collar 53 to engage the gear 56, even with the rod 28 fully extended.

Since the fluid inlet 36 is connected to the high range air supply outlet 16 of the range shift valve 12, air is supplied to the air cylinder 24 whenever air is supplied to the high range side of the piston in the fluid actuator assembly via the high range air line 20. Therefore, whenever the range section of the transmission is shifted from low range to high range, air is simultaneously supplied to the air cylinder 24 sufficient to overcome the force of the biasing means and urge the rod 28 to its fully extended position. Similarly, whenever the range section of the transmission is shifted from high range to low range, air is simultaneously exhausted from the air cylinder 24 and the rod 28 is retracted by the force of the biasing means.

In operation, the rod 28 is maintained in its retracted position while the transmission is in low range, allowing the shift rail 46 to move freely in either direction to selectively engage either gear 56 (4th gear) or gear 58 (5th gear). When the driver shifts the range gear section into the high range, the air cylinder 24 is activated and the rod 28 is extended into the notch 66 in the shift rail 46. In high range, the shift rail 46 remains free to move in one direction to selectively engage gear 56 (9th direct drive gear), but is restrained from moving in the opposite direction to engage gear 58 (10th overdrive gear). The 10th overdrive gear (5th gear, high range combination) is thereby locked out while the remaining gear combinations are unaffected.

Furthermore, the lockout mechanism of the present invention is easily removable or rendered inoperable to allow operation of any of the possible gear combinations. The air cylinder 24 may be unscrewed from the tapped hole 42 and an externally threaded plug (not shown) inserted in its place. The air cylinder air line 38 may be removed from the T fitting 40, and the T fitting plugged or simply replaced with an L-shaped fitting. Alternatively, the lockout mechanism may be simply rendered inoperative by blocking or disconnecting the air cylinder air line 38 in any suitable manner.

In accordance with the provisions of the patent statutes, the present invention has been described in what is considered to represent its preferred embodiment. However, it should be noted that the invention can be practiced otherwise than as specifically illustrated and described without departing from its spirit or scope. Thus, for example, it should be apparent that the present invention is not limited to utilization with merely the transmission disclosed. Rather, a transmission utilizing greater or lesser numbers of gear reduction ratios may incorporate the present invention to prohibit engagement into specific combinations of gear ratios. Multiple lockout mechanisms according to the present invention may, of course, also be utilized within a given transmission.

What is claimed is:

1. A gear combination lockout device for a range shift type transmission having a main gear section and a range gear section disposed within a housing, said main gear section including a first gear ratio selection means for effecting at least two distinct gear drive ratios, and further including at least one axially translatable shift rail associated with said first gear selection means, said range gear section including a second gear selection means for effecting at least two distinct gear drive ratios to selectively multiply the gear ratio provided by the main section, said second gear selection means including an actuator, the lockout device for inhibiting the selection of certain gear combinations comprising:

an actuation member mounted to said housing;
   a rod disposed within said actuation member which is selectively translatable between a retracted position and an extended position by activation of said actuation member, said rod extending through an aperture in said housing in its extended position;
   a means for activating the actuation member of said lockout device substantially simultaneously with the activation of the actuator of said second gear selection means; and
   an engagement means provided on said at least one shift rail associated with said first gear selection means;
   said actuation member being positioned on said housing so that said rod engages the engagement means on said shift rail when said rod is in its extended position to thereby selectively limit axial translation of said shift rail.

2. A gear combination lockout device as defined in claim 1, wherein the actuator of said second gear selection means is a fluid actuator, and said actuation member of said lockout device is a fluid actuation member.

3. A gear combination lockout device as defined in claim 2, wherein said fluid actuation member is an air cylinder.

4. A gear combination lockout device as defined in claim 2, wherein said fluid actuation member includes an externally threaded nipple which mates with a tapped hole provided in said housing.

5. A gear combination lockout device as defined in claim 2, wherein the fluid actuator of said second gear selection means includes a low range fluid supply line and a high range fluid supply line, and wherein said means for activating the actuation member provides communication between said high range fluid supply line and said fluid actuation member.

6. A gear combination lockout device as defined in claim 1, wherein said actuation member is a solenoid.

7. A gear combination lockout device as defined in claim 1, wherein said engagement means is comprised of a recess in said shift rail.

8. A gear combination lockout device as defined in claim 1, wherein said rod is normally urged to its retracted position.

9. A gear combination lockout device as defined in claim 1, wherein said main gear section includes five distinct gear drive ratios and said range gear section includes two distinct gear drive ratios.

10. A gear combination lockout device as defined in claim 9, wherein said range shift type transmission includes a tenth overdrive gear ratio.

11. A gear combination lockout device as defined in claim 1, wherein said rod is generally perpendicular to said at least one shift rail associated with said first gear selection means.

12. A gear combination lockout device for a range shift type transmission having a main gear section and a range gear section disposed within a housing, said main gear section including a first gear ratio selection means for effecting five distinct gear drive ratios and said range gear section including a second gear selection means for effecting two distinct gear drive ratios to selectively multiply the gear ratio provided by the main section, said range shift type transmission including a tenth overdrive gear ratio, and further including at least one axially translatable shift rail associated with said first gear selection means, said secnd gear selection means including an actuator, the lockout device for inhibiting the selection of certain gear combinations comprising:

an actuation member mounted to said housing;

a rod disposed within said actuation member which is selectively translatable between a retracted position and an extended position by activation of said actuation member, said rod extending through an aperture in said housing in its extended position;

a means for activating the actuation member of said lockout device substantially simultaneously with the activation of the actuator means of said second gear selection means; and an engagement means provided on said the shift rail of said first gear selection means associated with said tenth overdrive gear ratio;

said actuation member being positioned on said housing so that said rod engages the engagement means on said shift rail when said rod is in its extended position to thereby selectively limit axial translation of said shift rail.

* * * * *